(12) United States Patent
Yuan et al.

(10) Patent No.: US 11,476,058 B2
(45) Date of Patent: Oct. 18, 2022

(54) SUPERCAPACITOR

(71) Applicants: Tsinghua University, Beijing (CN); HON HAI PRECISION INDUSTRY CO., LTD., New Taipei (TW)

(72) Inventors: Hua Yuan, Beijing (CN); Guang Wang, Beijing (CN); Yang Wu, Beijing (CN); Yang Wei, Beijing (CN); Yue-Gang Zhang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 182 days.

(21) Appl. No.: 16/844,342

(22) Filed: Apr. 9, 2020

(65) Prior Publication Data

US 2021/0166888 A1    Jun. 3, 2021

(30) Foreign Application Priority Data

Nov. 29, 2019   (CN) .......................... 201911207320.3

(51) Int. Cl.
*H01G 11/36*       (2013.01)
*H01G 4/32*        (2006.01)
(Continued)

(52) U.S. Cl.
CPC ............. *H01G 11/36* (2013.01); *H01G 4/32* (2013.01); *H01G 11/24* (2013.01); *H01G 11/40* (2013.01);
(Continued)

(58) Field of Classification Search
CPC ........ H01G 11/24; H01G 11/30; H01G 11/36; H01G 4/32; H01G 11/40; H01G 11/46; H01G 11/74
(Continued)

(56) References Cited

U.S. PATENT DOCUMENTS

2015/0332860 A1*  11/2015  Yin ........................ H01G 11/36
                                                                    361/502
2018/0374659 A1*  12/2018  Kim ....................... H01G 11/40

FOREIGN PATENT DOCUMENTS

CN        103400702         11/2013
CN        104282444          1/2015
(Continued)

OTHER PUBLICATIONS

En-Hui Liu et al., Preparation and characterization of nanostructured NiO/MnO2 composite electrode for electrochemical supercapacitors, Materials Research Bulletin, vol. 44, pp. 1122 1126, Oct. 15, 2008.
(Continued)

*Primary Examiner* — Arun Ramaswamy
(74) *Attorney, Agent, or Firm* — ScienBiziP, P.C.

(57) ABSTRACT

A supercapacitor is provided. The supercapacitor includes an elastic fiber, an internal electrode, a first electrolyte layer, and an external electrode. The internal electrode, the first electrolyte layer, and the external electrode are sequentially wrapped on an outer surface of the elastic fiber. The internal electrode includes a first carbon nanotube film and a NiO@MnO$_x$ composite structure, and the external electrode includes a second carbon nanotube film and a Fe$_2$O$_3$ layer.

20 Claims, 16 Drawing Sheets

(51) Int. Cl.
- *H01G 11/24* (2013.01)
- *H01G 11/40* (2013.01)
- *H01G 11/46* (2013.01)
- *H01G 11/74* (2013.01)
- *B82Y 30/00* (2011.01)

(52) U.S. Cl.
CPC ............ *H01G 11/46* (2013.01); *H01G 11/74* (2013.01); *B82Y 30/00* (2013.01)

(58) Field of Classification Search
USPC ................................. 361/502, 503, 508, 516
See application file for complete search history.

(56) References Cited

FOREIGN PATENT DOCUMENTS

| CN | 104282444 A | * | 1/2015 |
|----|-------------|---|--------|
| CN | 104795250   |   | 7/2015 |
| CN | 105957724 A | * | 9/2016 |
| CN | 109192522 A | * | 1/2019 |

OTHER PUBLICATIONS

Bebi Patil, et al., Electrochemical performance of a coaxial fiber-shaped asymmetric supercapacitor based on nanostructured $MnO_2$/CNT-web paper and $Fe_2O_3$/carbon fiber electrodes, Carbon, vol. 134, pp. 366-375, Mar. 27, 2018.

* cited by examiner

SUPERCAPACITOR

CROSS-REFERENCE TO RELATED APPLICATIONS

This application claims all benefits under 35 U.S.C. § 119 from the Chinese Patent Application No. 201911207320.3, filed on Nov. 29, 2019, in the China Intellectual Property Office, the disclosure of which is incorporated herein by reference.

FIELD

The subject matter herein generally relates to a supercapacitor.

BACKGROUND

With the emergence of wearable and portable electronics with flexibility, fiber-shaped supercapacitors (FSCs) have motived tremendous research interest due to their tiny volume, light weight, high flexibility and unique 1D structure. But these flexible FSCs without elasticity would be damaged when forced strain. The flexible FSCs can be fabricated by assembling fiber electrodes into a helical structure, or by the layer-by-layer assembling of electrodes, a separator, an outer electrode on elastic fibers to form coaxial configuration. However, there are insufficient direct contact areas between two electrodes for helix stretchable FSCs. During the stretching or bending process, the two electrodes detach from each other in geometry, leading to high internal resistance and reduction in electrochemical performance. For coaxial stretchable FSCs, the contact areas are larger and more efficient. Chinese Patent No.CN103400702B has disclosed an elastic coaxial linear supercapacitor, the inner and outer electrodes are wound along a same axis, and the supercapacitor is a symmetrical structure because the inner and outer electrodes are both made of carbon nanotubes, and the potential window obtained by the supercapacitor is only 1.0V, and the energy stored in the supercapacitor is very low.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Implementations of the present technology will be described, by way of example only, with reference to the attached figures.

FIG. 6b is a partial enlarged view of FIG. 6a.

DETAILED DESCRIPTION

Figure 1:
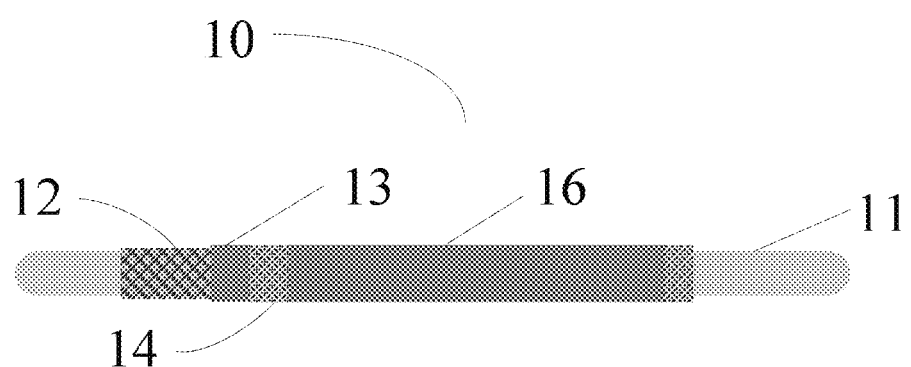
FIG. 1 is a schematic view of one embodiment of a supercapacitor.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape, or other feature that the term modifies, such that the component need not be exact. The term "comprising" means "including, but not necessarily limited to"; it specifically indicates open-ended inclusion or membership in a so-described combination, group, series, and the like. It should be noted that references to "an" or "one" embodiment in this disclosure are not necessarily to the same embodiment, and such references mean "at least one".

Referring to FIG. 1, a supercapacitor 10 of one embodiment is provided. The supercapacitor 10 includes an elastic fiber 11, an internal electrode 12, a first electrolyte layer 13, and an external electrode 14. The internal electrode 12, the first electrolyte layer 13, and the external electrode 14 are sequentially wrapped on an outer surface of the elastic fiber 11. The internal electrode 12 includes a carbon nanotube film and a NiO@MnO$_x$ composite structure, and the external electrode 14 includes a carbon nanotube film and a Fe$_2$O$_3$ layer.

The elastic fiber 11 is an elastic linear structure. The stretch rate of the elastic fiber 11 can be 200%. The elastic fiber 11 is flexible and can be bent and folded arbitrarily. The diameter of the elastic fiber 11 can be selected according to need. In one embodiment, the diameter of the elastic fiber 11 is 450 micrometers.

Figure 2A:
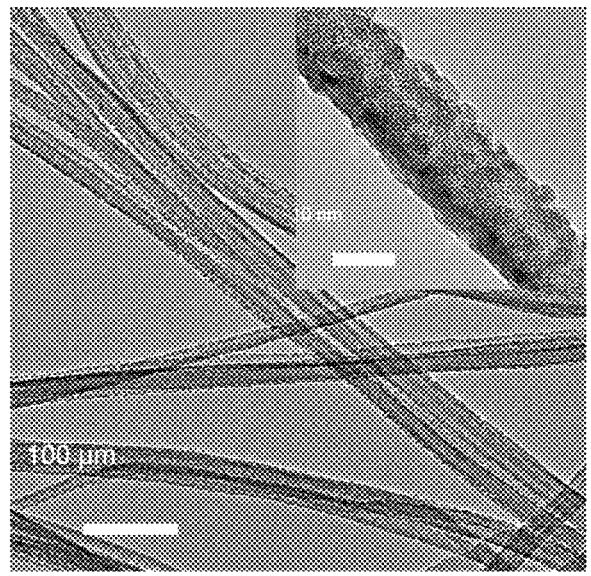
FIG. 2a is a TEM image of the NiO@MnO$_x$ composite structure attached to the carbon nanotube film.
Figure 2B:
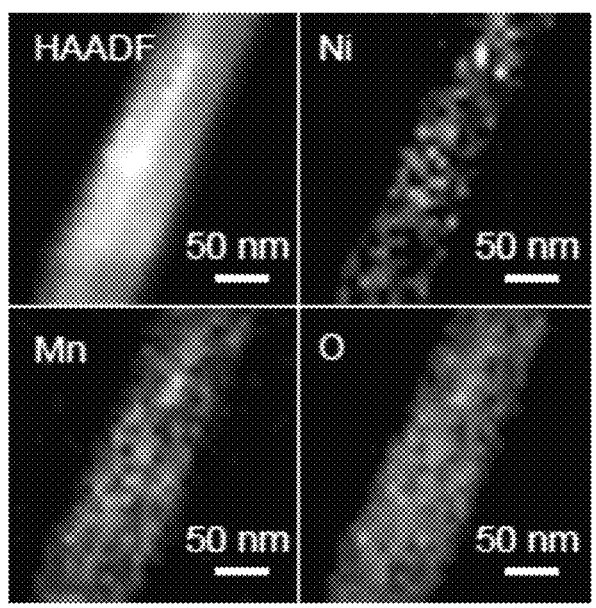
FIG. 2b is an EDS spectrum of Mn, Ni, O, the plurality of NiO nanoparticles and MnO$_x$ nanoparticles.

The internal electrode 12 is a composite film formed by the carbon nanotube film and the NiO@MnO$_x$ composite structure. The internal electrode 12 can be expressed by the CNT@NiO@MnO$_x$ composite film. For the CNT@NiO@MnO$_x$ composite film, the NiO@MnO$_x$ composite structure is attached to a surface of the carbon nanotube film. The NiO@MnO$_x$ composite structure includes a NiO layer and a MnO$_x$ layer. The NiO layer is attached to the surface of the carbon nanotube film. The MnO$_x$ layer is attached to the NiO layer. The NiO layer includes a plurality of NiO nanoparticles. The MnO$_x$ layer includes a plurality of MnO$_x$ nanoparticles. Furthermore, NiO@MnO$_x$ composite structure is attached to both to opposite surfaces of the carbon nanotube film. Referring to FIGS. 2a and 2b, FIG. 2a shows a TEM image of the NiO@MnO$_x$ composite structure attached to the carbon nanotube film; FIG. 2b shows EDS spectrum of Mn, Ni, O, the plurality of NiO nanoparticles and MnO$_x$ nanoparticles adhere uniformly to the carbon nanotube film. Since excessive oxide particles attached to the carbon nanotube film can cause poor electrode conductivity, the distribution density of the NiO nanoparticles on the carbon nanotube film is less than or equal to 8 μg/cm$^2$, the distribution density of the MnO$_x$ nanoparticles on the carbon nanotube film is less than or equal to 2 μg/cm$^2$. In one embodiment, the distribution density of the NiO nanoparticles on the carbon nanotube film is 0.37 μg/cm$^2$, the distribution density of the MnO$_x$ nanoparticles on the carbon nanotube film is 1.34 μg/cm$^2$. The mass ratio of the NiO nanoparticles of the internal electrode 12 is 7.05%, and the mass ratio of the MnO$_x$ nanoparticles of the internal electrode 12 is 25.16%.

The carbon nanotube film comprises a plurality of carbon nanotubes oriented along a same direction, joined to each other end to end by van der Waals attractive force. The carbon nanotubes in the carbon nanotube film can be single-walled, double-walled, or multi-walled carbon nanotubes. A diameter of each single-walled carbon nanotube ranges from about 0.5 nanometers (nm) to about 10 nm. A diameter of each double-walled carbon nanotube ranges from about 1 nm to about 15 nm. A diameter of each multi-walled carbon nanotube ranges from about 1.5 nm to about 50 nm. The carbon nanotube film can be a free-standing structure. The free-standing structure is that the carbon nanotube film can keep a certain shape without any supporter, which is different from powder or liquid. The carbon nanotube film comprises the plurality of carbon nanotubes joined to each other by van der Waals attractive force, thereby forming a certain shape. The carbon nanotube film can be a drawn carbon nanotube film, a ribbon-shaped carbon nanotube film, a rolled carbon nanotube film, or a flocculated carbon nanotube film. In one embodiment, the carbon nanotube film is a drawn carbon nanotube film.

Figure 3:
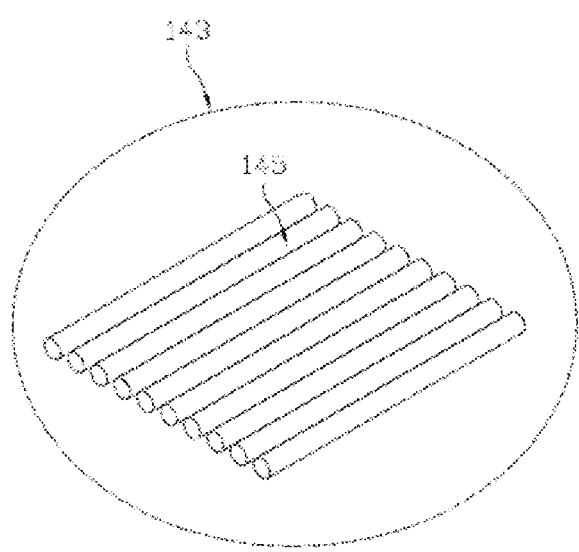
FIG. 3 is a schematic graph of the drawn carbon nanotube fragments.
Figure 4:
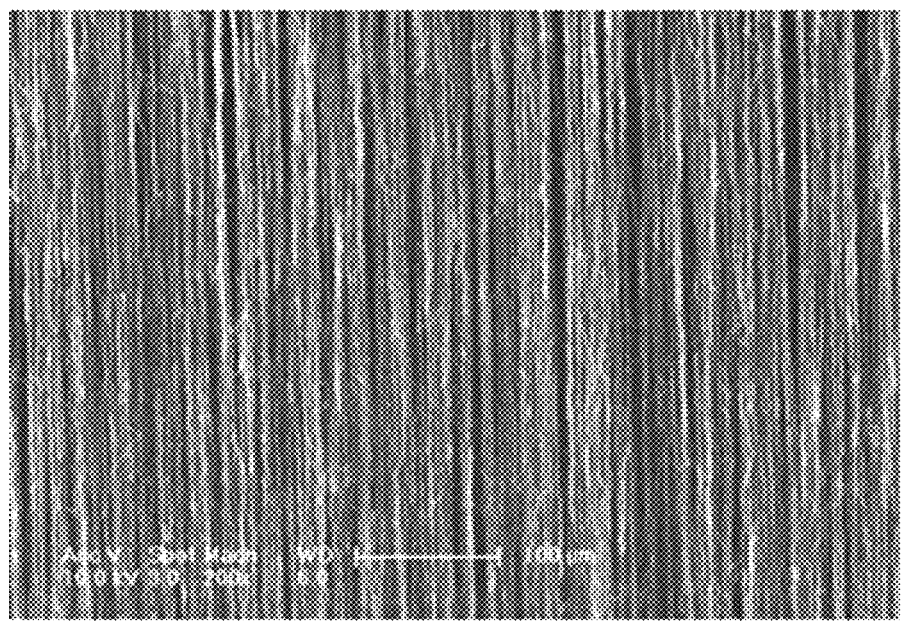
FIG. 4 is a Scanning Electron Microscope (SEM) image of the drawn carbon nanotube film.

Referring to FIG. 3 and FIG. 4, the drawn carbon nanotube film can be pulled out from a super-aligned carbon nanotube array. The drawn carbon nanotube film comprises one carbon nanotube segment 143. The carbon nanotube segment 143 comprises a plurality of carbon nanotubes 145 substantially arranged along the same direction. The carbon nanotubes 145 in the carbon nanotube film are substantially parallel to each other and have almost equal lengths, and are combined side by side via van der Waals attractive force. The width of the carbon nanotube film is equal to the length of the carbon nanotubes 145, thus at least one carbon nanotube 145 spans the entire width of the carbon nanotube film. Also, the carbon nanotube film can include a plurality of carbon nanotube crossed or weaved together to form a carbon nanotube net. The carbon nanotube net defines a plurality of holes. The plurality of holes extend throughout the carbon nanotube film along the thickness direction of the carbon nanotube film. Examples of a drawn carbon nanotube film are taught by U.S. Pat. No. 7,045,108 to Jiang et al., and WO 2007015710 to Zhang et al.

In one embodiment, the carbon nanotube film includes two stacked drawn carbon nanotube films, and the aligned directions of the carbon nanotubes in the two stacked drawn carbon nanotube films are perpendicular to each other.

The internal electrode 12 is directly winded on the outer surface of the elastic fiber 11. Since the length of the carbon nanotube film of the internal electrode 12 is much larger than the perimeter of the cross section of the elastic fiber 11, and the carbon nanotube film can wind on the elastic fiber 11 many times. The number of winding times of the internal electrode 12 on the elastic fiber 11 range from 5 to 80. Thus, not only the NiO@MnO$_x$ composite structure as an active material of the internal electrode 12 exist on the surface of the internal electrode 12, but also the NiO@MnO$_x$ composite structure is distributed in the internal electrode 12.

The first electrolyte layer 13 is disposed on an outer surface of the internal electrode 12. The material of the first electrolyte layer 13 is gel electrolyte. In one embodiment, the first electrolyte layer 13 is a PVA/LiCl gel electrolyte.

Figure 5A:
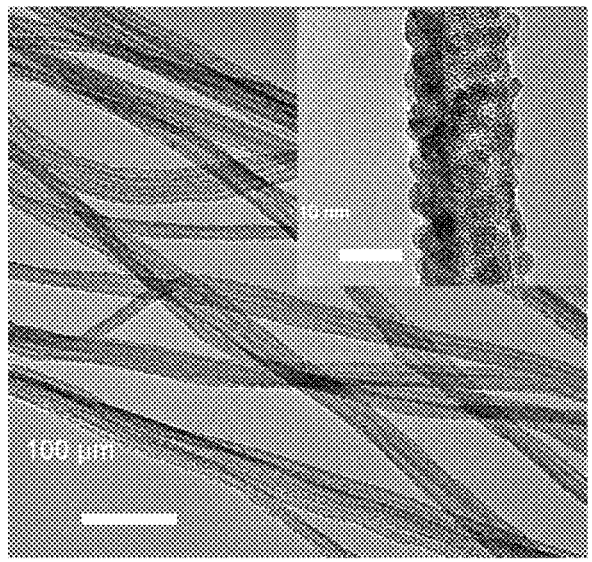
FIG. 5a is a TEM image of the plurality of Fe$_2$O$_3$ nanoparticles attached to the carbon nanotube film.
Figure 5B:
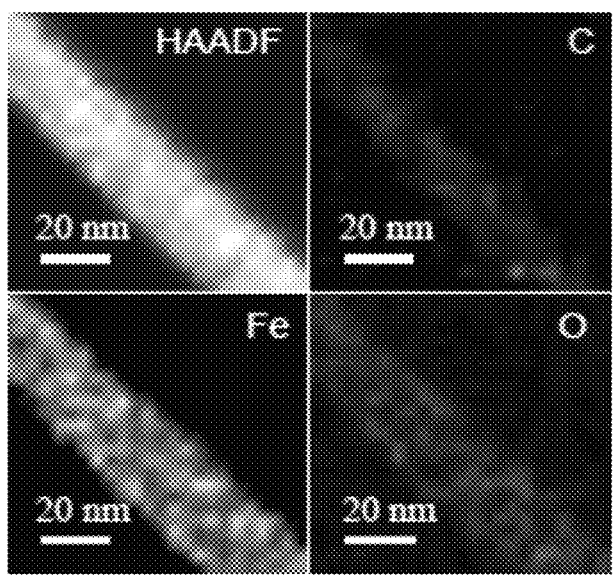
FIG. 5b is an EDS spectrum of Fe, C, O, the plurality of Fe$_2$O$_3$ nanoparticles.

The external electrode 14 is wrapped on the first electrolyte layer 13 and isolated from the internal electrode 12 by the first electrolyte layer 13. The external electrode 14 includes a carbon nanotube film and a Fe$_2$O$_3$ layer. The external electrode 14 is a composite film consisting of the carbon nanotube film and the Fe$_2$O$_3$ layer. The external electrode 14 can be expressed by the CNT@ Fe$_2$O$_3$ composite film. For the CNT@ Fe$_2$O$_3$ composite film, the Fe$_2$O$_3$ layer is attached to a surface of the carbon nanotube film. The Fe$_2$O$_3$ layer includes a plurality of Fe$_2$O$_3$ nanoparticles. Furthermore, the plurality of Fe$_2$O$_3$ nanoparticles is attached to both surfaces of the carbon nanotube film. Referring to FIGS. 5a and 5b, FIG. 5a shows a TEM image of the plurality of Fe$_2$O$_3$ nanoparticles attached to the carbon nanotube film; FIG. 5b shows EDS spectrum of Fe, C, 0, the plurality of Fe$_2$O$_3$ nanoparticles adhere uniformly to the carbon nanotube film. The distribution density of the Fe$_2$O$_3$ nanoparticles on the carbon nanotube film is less than or equal to 10 μg/cm$^2$. In one embodiment, the distribution density of the Fe$_2$O$_3$ nanoparticles on the carbon nanotube film is 4 μg/cm$^2$, and the mass ratio of the Fe$_2$O$_3$ nanoparticles in the external electrode 14 is 52.94%. The structure of the carbon nanotube film in the external electrode 14 is the same to the structure of the carbon nanotube film in the internal electrode 12.

The supercapacitor 10 further includes a second electrolyte layer 15 and a third electrolyte layer 16. The second electrolyte layer 15 is located between the elastic fiber 11 and the internal electrode 12. The second electrolyte layer 15 is configured to wet the internal electrode 12. The third electrolyte layer 16 is located on the outer surface of the external electrode 14 to wet the external electrode 14, and the third electrolyte layer 16 is also used as a protective layer to protect the entire device. The material of the second electrolyte layer 15 and the third electrolyte layer 16 is the same as the material of the first electrolyte layer 13.

Figure 6A:
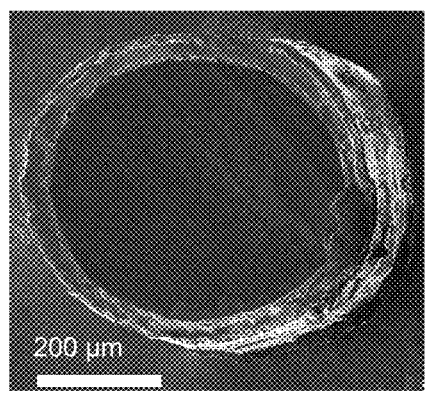
FIG. 6a is a SEM image of cross section of the supercapacitor.
Figure 6B:
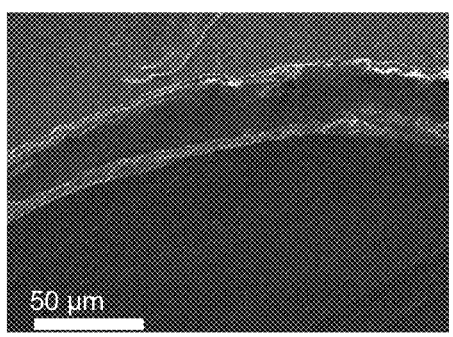
Figure 6C:
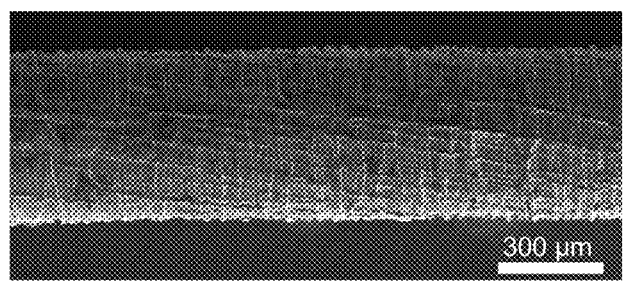
FIG. 6c is a SEM image of the supercapacitor in an unstretched state.
Figure 6D:
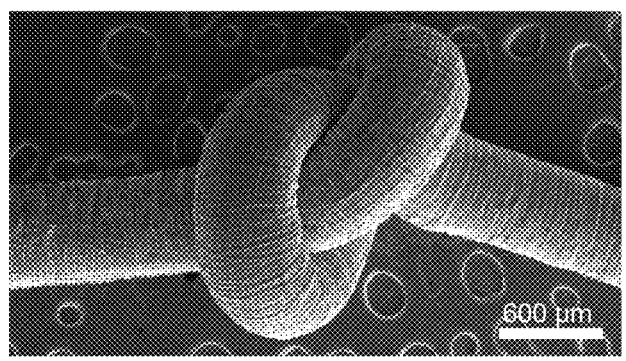
FIG. 6d is a SEM image of the supercapacitor with a knot.

Referring to FIG. 6a-6d, FIG. 6a shows a SEM image of cross section of the supercapacitor 10; FIG. 6b shows a partially enlarged view of FIG. 6a, that the internal electrode 12 and the external electrode 14 are separated by the first electrolyte layer 13; FIG. 6c shows a SEM image of the supercapacitor 10 in a non-stretched state, the highly overlapped carbon nanotube films lead to a wrinkled structure, the wrinkled structure can provide both high electrical conductivity and facilitated stretchability of electrodes; FIG. 6d shows a SEM image of the supercapacitor 10 with a knot, it indicates that the supercapacitor 10 is flexible.

Figure 7:
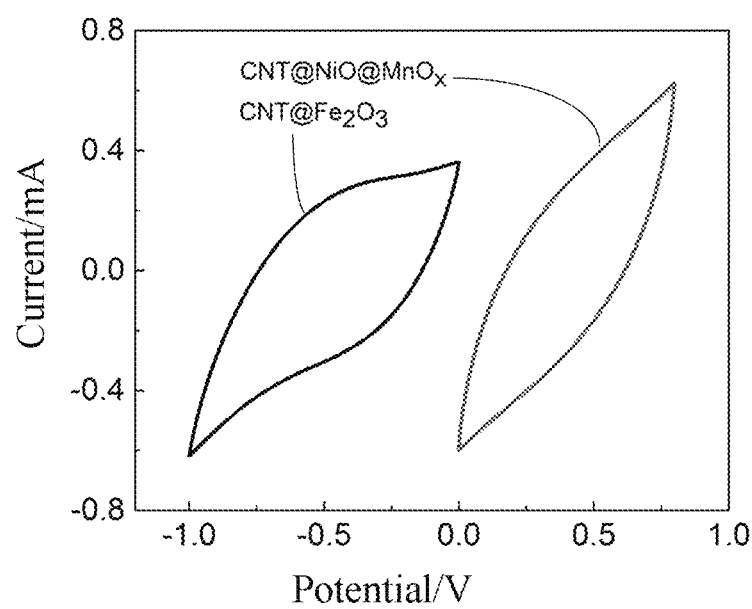
FIG. 7 is cyclic voltammetry (CV) curves of an internal electrode and an external electrode of the supercapacitor.
Figure 8:
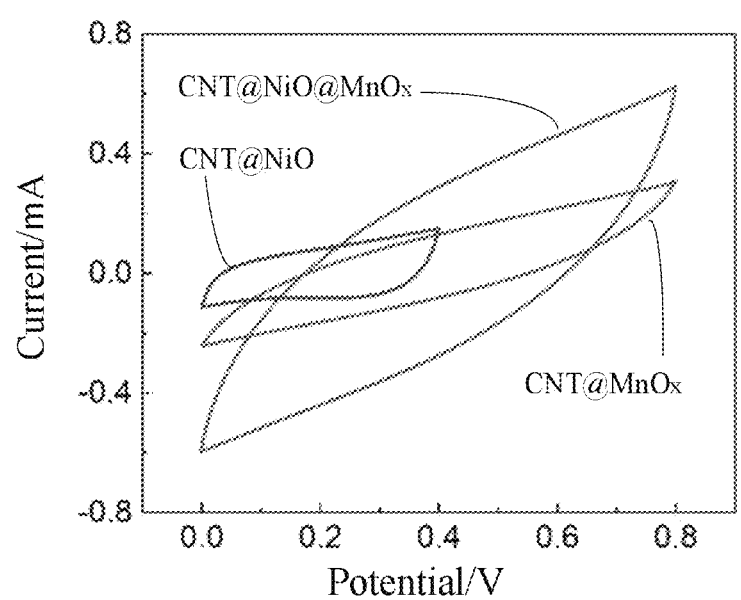
FIG. 8 is CV curves of the CNT@NiO@MnO$_x$ composite film, the CNT@NiO fiber electrode, the CNT@MnO$_x$ fiber electrode.
Figure 9A:
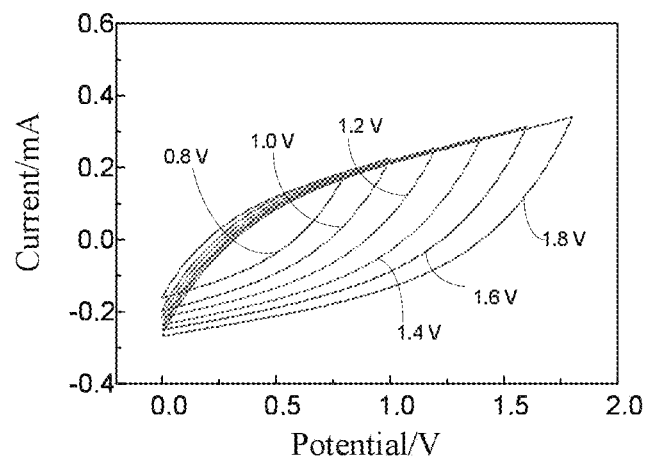
FIG. 9a is a series of CV of the supercapacitor with increasing potential window ranging from 0.8V to 1.8V.
Figure 9B:
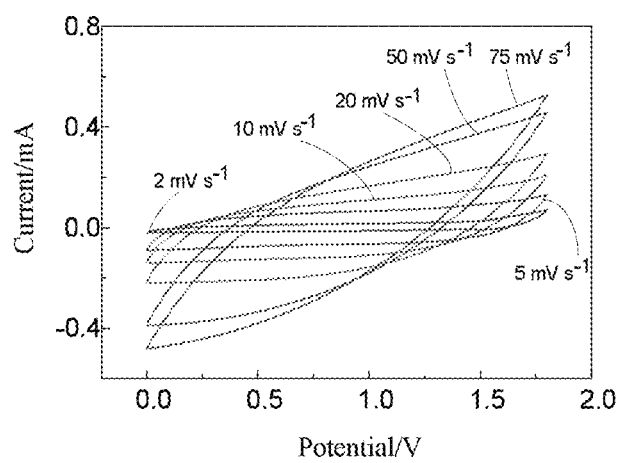
FIG. 9b is a series of CV of the supercapacitor at different scan rates from 2 mV s$^{-1}$ to 75 mV s$^{-1}$ under the potential window of the 1.8V.

To show the electrochemical performance of the supercapacitor 10, a three-electrode system is carried out with 1 M LiCl as an electrolyte, a platinum electrode as a counter electrode, and Ag/AgCl as the reference electrode. Referring to FIG. 7, FIG. 7 shows cyclic voltammetry (CV) curves of the internal electrode 12 and the external electrode 14 of the supercapacitor 10. The potential window of the CNT@NiO@MnO$_x$ composite film of the internal electrode 12 is from 0V to 0.8V; the potential window of the CNT@Fe$_2$O$_3$ composite film of the external electrode 14 is from −1.0V to 0V. Thus, the potential window of the supercapacitor 10 can be 1.8V. Furthermore, to show the superior electrochemical performance of the supercapacitor 10, a CNT@NiO fiber electrode and a CNT@MnO$_x$ fiber electrode with same weight of active materials, are also tested for comparison. The CNT@NiO fiber electrode is a composite film formed by a carbon nanotube film and a NiO layer. The CNT@MnO$_x$ fiber electrode is a composite film including a carbon nanotube film and a MnO$_x$ layer. Referring to FIG. 8, FIG. 8 shows cyclic voltammetry (CV) curves of the CNT@NiO@MnO$_x$ composite film, the CNT@NiO fiber electrode, the CNT@MnO$_x$ fiber electrode. The CNT@NiO@MnO$_x$ composite film has a greater current density and capacity than the other fiber electrodes. Because the MnO$_x$ nanoparticles having a large capacity and a high potential window in theory can be used as a positive electrode, but the poor conductivity limits the electrode performance of the MnO$_x$ nanoparticles. The CNT@NiO@MnO$_x$ composite film as a binary oxide is composed of NiO nanoparticles and MnO$_x$ nanoparticles, and the binary oxide has a synergistic effect and a plurality of redox reaction paths, which improves the capacity of the internal electrode 12. Referring to FIGS. 9a and 9b, FIG. 9a shows a series of CV of the supercapacitor 10 with increasing potential window ranging from 0.8V to 1.8V; FIG. 9b shows a series of CV of the supercapacitor 10 at different scan rates from 2 mV s$^{-1}$ to 75 mV s$^{-1}$ under the potential window of the 1.8V. The pseudocapacitive behavior of CV curves is attributed to a continuous and reversible faradic reaction of active materials. This behavior is in good agreement with the charge/discharge performances at various current densities.

Figure 10:
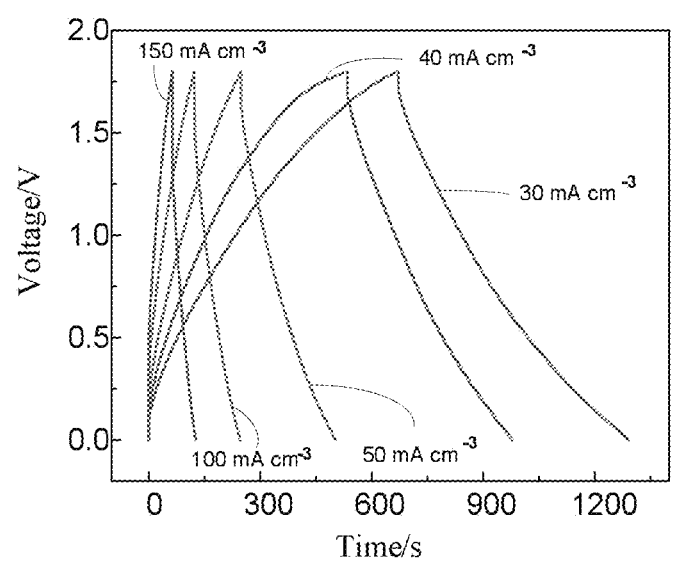
FIG. 10 is linear and symmetric galvanostatic charge/discharge (GCD) curves of the supercapacitor at various current densities from 30 mA cm$^{-3}$ to 150 mA cm$^{-3}$.
Figure 11:
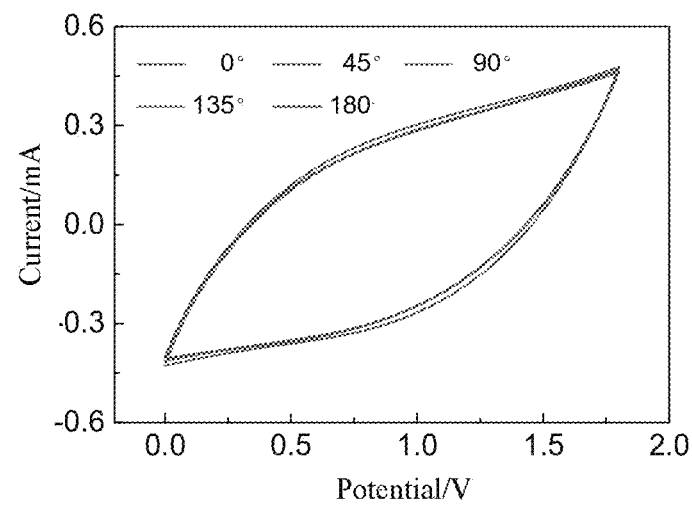
FIG. 11 is a series of CV curves of the supercapacitor at different bending angles.
Figure 12:
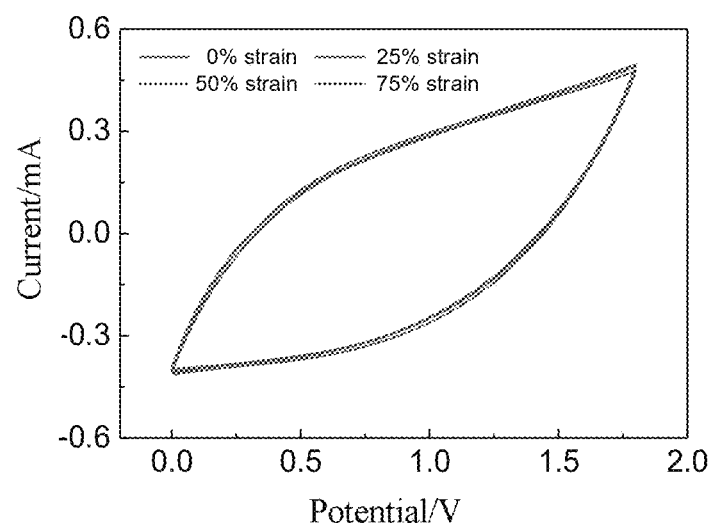
FIG. 12 is a series of CV curves of the supercapacitor at different strains from 0 to 75%.
Figure 13:
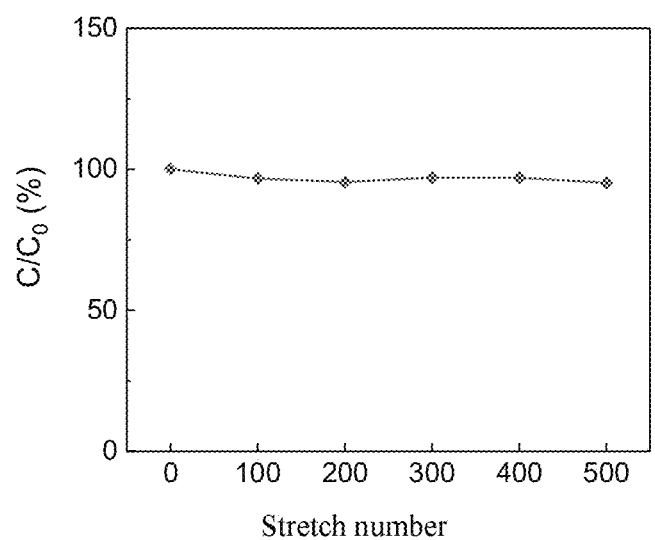
FIG. 13 is a curve of the capacitance retention of the supercapacitor with increasing stretching times at a strain of 50%.
Figure 14:
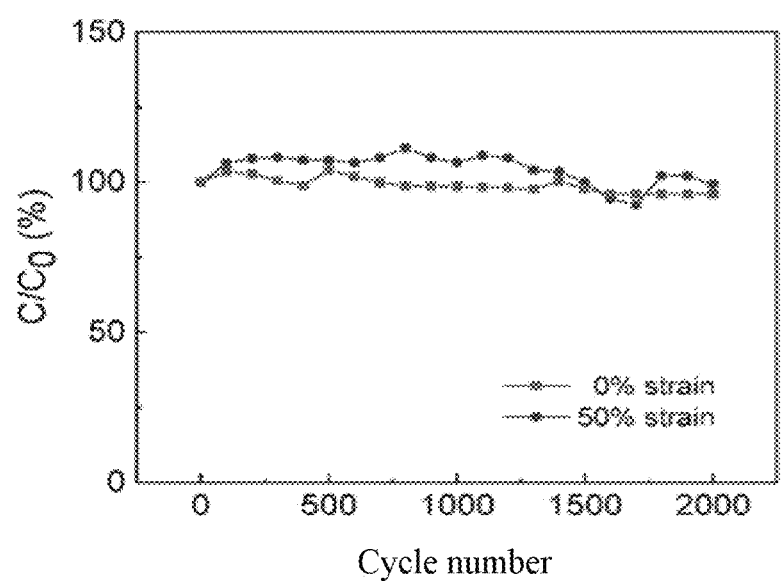
FIG. 14 is curves of the capacitance retention of the supercapacitor with different strains.

Referring to FIG. 10, FIG. 10 shows linear and symmetric galvanostatic charge/discharge (GCD) curves of the supercapacitor 10 at various current densities from 30 mA cm$^{-3}$ to 150 mA cm$^{-3}$. According to the GCD curves, the supercapacitor 10 delivers a high volumetric capacitance of 10.4 F cm$^{-3}$ (29.3 mF cm$^{-2}$) at current density of 30 mA cm$^{-3}$ (0.1 mA cm$^{-2}$), corresponding to 4.7 mWh cm$^{-3}$(13.2 μWh cm$^{-2}$). Referring to FIG. 11, FIG. 11 shows a series of CV curves of the supercapacitor 10 at different bending angles, and the change of CV curves are negligible under different bending angles. Referring to FIG. 12, FIG. 12 shows a series of CV curves of the supercapacitor 10 at different strains from 0 to 75%, the CV curves remain unchanged with increasing strains up to 75%. Referring to FIG. 13, FIG. 13 shows a curve of the capacitance retention of the supercapacitor 10 with increasing stretching times at a strain of 50%, there is little decrease about the curve after stretching for 500 times when applied a strain of 50%, which demonstrates the robust mechanical property of the supercapacitor 10. Referring to FIG. 14, FIG. 14 shows curves of the capacitance retention of the supercapacitor 10 with different strains, the supercapacitor 10 exhibits excellent cycling stability with a high capacitance retention of 96% after 2000 cycles at 50 mV s$^{-1}$ under strain remains 0%; the curve shows that even 99% after 2000 cycles under strain remains 50% at 50 mV s$^{-1}$.

The supercapacitor 10 is a coaxial linear supercapacitor, leading to low internal resistance. The internal electrode 12 and the external electrode 14 are made of different materials to form the supercapacitor 10 with an asymmetric structure, so that the supercapacitor 10 has a high potential window and energy density. The potential window of the supercapacitor 10 can be 1.8V, and the energy density of the supercapacitor 10 can be 4.7 mWh cm$^{-3}$. The supercapacitor 10 is an elastic structure, and the capacitance retention can be 99% after 2000 cycles under strain remains 50% at 50 mV s$^{-1}$.

Figure 15:
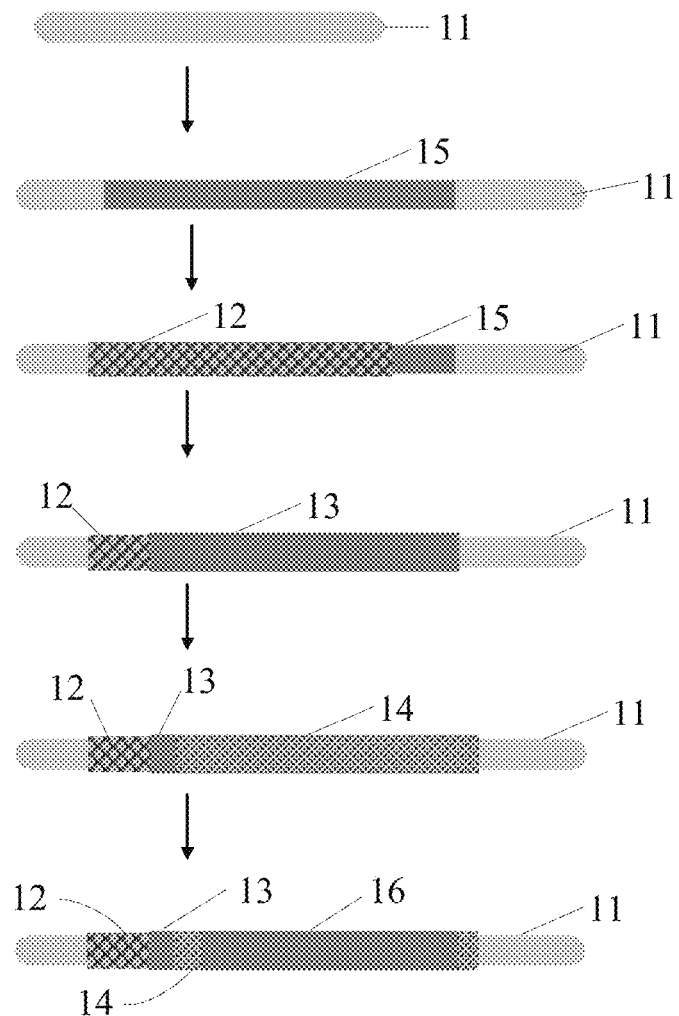
FIG. 15 is a flow chart of one embodiment of a method for making the supercapacitor.

Referring to FIG. 15, a method for making the supercapacitor 10 of one embodiment includes the following steps:

step (S10), providing the elastic fiber 11;

step (S11), stretching the elastic fiber 11 to a strain of 50%, then coating the second electrolyte layer 15 on the elastic fiber 11;

step (S12), wrapping the internal electrode 12 on the surface of the second electrolyte layer 15, wherein the internal electrode 12 is the CNT@NiO@MnO$_x$ composite film;

step (S13), coating the first electrolyte layer 13 on the outer surface of the internal electrode 12;

step (S14), wrapping the external electrode 14 on the surface of the first electrolyte layer 13, wherein the external electrode 14 is the CNT@ Fe$_2$O$_3$ composite film; and step (S15), coating the third electrolyte layer 16.

In step S11, the material of the second electrolyte layer 15 can be the same as the material of the first electrolyte layer 13. The second electrolyte layer 15 is configured to wet the carbon nanotube film. In one embodiment, the second electrolyte layer 15 is PVA/LiCl gel electrolyte. But the step S11 is not a necessary step for preparing the supercapacitor 10 and can be omitted.

In step S12, the CNT@NiO@MnO$_x$ composite film is obtained by depositing the NiO@MnO$_x$ composite structure on the carbon nanotube film by magnetron sputtering.

Figure 16:
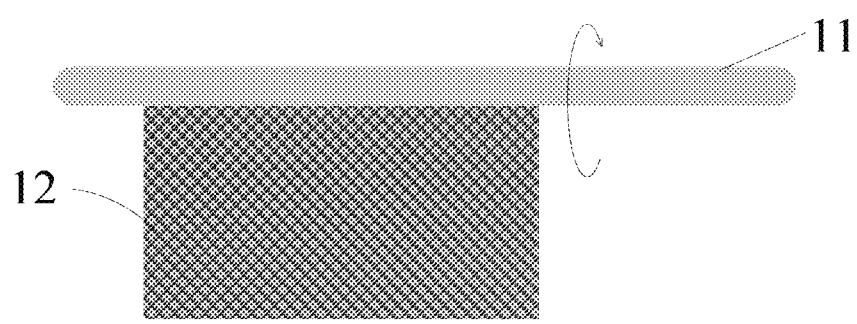
FIG. 16 is a graph of a relation between the direction of wrapping the elastic fiber and an extending direction.

The method of depositing the NiO@MnO$_x$ composite structure on the carbon nanotube film includes following steps: attaching the carbon nanotube film on a substrate vertically under a sputtering gun with a distance of 10 cm in the chamber; filling the chamber with 25 sccm argon to reach a working pressure of 1.0 Pa after the chamber is vacuum pumped down to a pressure of 2×10$^{-3}$ Pa; using bulk Ni with high purity as targets to depositing NiO nanoparticles for 10 sec by apply 100 mA sputtering current to form a NiO layer on the carbon nanotube film; keeping the working pressure at 0.3 Pa by a constant flow of 17.5 sccm argon and 2.5 sccm oxygen after the chamber is evacuated to a pressure of $1\times10^{-3}$ Pa; replacing Ni with Mn as targets to deposition MnOx nanoparticles for 360 sec by apply 100 mA sputtering current to form a MnOx layer on the NiO layer; taking out the carbon nanotube film with the MnOx layer and the NiO layer thereon from the chamber and putting in the oven at 80 Celsius degrees for heating one hour to obtain the CNT@NiO@MnO$_x$ composite film. Referring to FIG. 16, the direction of the length of the elastic fiber 11 is set as an extending direction, the direction in which the CNT@NiO@MnO$_x$ composite film wraps the elastic fiber 11 (shown by the arrow direction) is perpendicular to the extending direction. Since the CNT@NiO@MnO$_x$ composite film can wrap around the elastic fiber 11 many times, the CNT@NiO@MnO$_x$ composite film overlaps on the elastic fiber 11. The CNT@NiO@MnO$_x$ composite film is not spirally wound on the elastic fiber 11.

In step S13, the method of making the first electrolyte layer 13 includes following the steps: mixing 5 g PVA and 5 g LiCl in 50 mL deionized water to form a mixture, and heating the mixture at 80 Celsius degrees under vigorous stirring.

In step S14, the CNT@Fe$_2$O$_3$ composite film is obtained by depositing the Fe$_2$O$_3$ nanoparticles on the carbon nanotube film by magnetron sputtering.

The method of depositing the Fe$_2$O$_3$ nanoparticles on the carbon nanotube film includes following steps: attaching the carbon nanotube film on a substrate vertically under a sputtering gun with a distance of 10 cm in the chamber; filling the chamber with 25 sccm argon to reach a working pressure of 1.0 Pa after the chamber is vacuum pumped down to a pressure of $2\times10^{-3}$ Pa; using bulk Fe with high purity as targets to depositing Fe$_2$O$_3$ nanoparticles for 90 sec by apply 100 mA sputtering current to form a Fe$_2$O$_3$ layer on the carbon nanotube film. The method of wrapping the first electrolyte layer 13 with the CNT@Fe$_2$O$_3$ composite film is the same as the wrapping method of step S12.

In step S15, the material of the third electrolyte layer 16 is the same as the material of the first electrolyte layer 13. The third electrolyte layer 16 is configured to wet the carbon nanotube film. In one embodiment, the third electrolyte layer 16 is PVA/LiCl gel electrolyte. But the step S15 is not a necessary step for preparing the supercapacitor 10 and can be omitted.

Depending on the embodiment, certain of the steps of methods described may be removed, others may be added, and the sequence of steps may be altered. The description and the claims drawn to a method may comprise some indication in reference to certain steps. However, the indication used is only to be viewed for identification purposes and not as a suggestion for ordering the steps.

What is claimed is:

1. A supercapacitor, comprising an elastic fiber, an internal electrode, a first electrolyte layer, and an external electrode; wherein the internal electrode, the first electrolyte layer, and the external electrode are sequentially wrapped on an outer surface of the elastic fiber, wherein the internal electrode comprises a first carbon nanotube film and a NiO@MnO$_x$ composite structure, and the external electrode comprises a second carbon nanotube film and a Fe$_2$O$_3$ layer; the internal electrode is wrapped on the outer surface of the elastic fiber, so that the outer surface of the elastic fiber is enclosed by the internal electrode; the first electrolyte layer is wrapped on the internal electrode, and the external electrode is wrapped on the first electrolyte layer, so that the internal electrode is enclosed by the external electrode; and a direction of the internal electrode wrapping the elastic fiber is perpendicular to an extending direction of the elastic fiber.

2. The supercapacitor of claim 1, wherein a stretch rate of the elastic fiber is 200%.

3. The supercapacitor of claim 1, wherein a diameter of the elastic fiber is 450 micrometers.

4. The supercapacitor of claim 1, wherein the NiO@MnO$_x$ composite structure is attached to a surface of the first carbon nanotube film.

5. The supercapacitor of claim 1, wherein the NiO@MnO$_x$ composite structure is attached to both two opposite surfaces of the first carbon nanotube film.

6. The supercapacitor of claim 1, wherein the NiO@MnO$_x$ composite structure comprises a NiO layer and a MnO$_x$ layer.

7. The supercapacitor of claim 6, wherein the NiO layer is attached to a surface of the first carbon nanotube film.

8. The supercapacitor of claim 6, wherein the MnO$_x$ layer is attached to a surface of the NiO layer.

9. The supercapacitor of claim 6, wherein the NiO layer comprises a plurality of NiO nanoparticles, and the MnO$_x$ layer comprises a plurality of MnO$_x$ nanoparticles.

10. The supercapacitor of claim 9, wherein a distribution density of the NiO nanoparticles on the first carbon nanotube film is less than or equal to 8 μg/cm$^2$, and a distribution density of the MnO$_x$ nanoparticles on the first carbon nanotube film is less than or equal to 2 μg/cm$^2$.

11. The supercapacitor of claim 1, wherein each of the first carbon nanotube film and the second carbon nanotube film comprises a plurality of carbon nanotubes oriented along a same direction, joined to each other end to end by van der Waals attractive force.

12. The supercapacitor of claim 1, wherein each of the first carbon nanotube film and the second carbon nanotube film comprises a plurality of carbon nanotubes in two directions, and the two directions are perpendicular to each other.

13. The supercapacitor of claim 1, wherein the internal electrode is directly winded on an outer surface of the elastic fiber.

14. The supercapacitor of claim 13, wherein the internal electrode is winded on the outer surface of the elastic fiber in a plurality of layers, and the plurality of layers are completely coincident.

15. The supercapacitor of claim 1, wherein the Fe$_2$O$_3$ layer comprises a plurality of Fe$_2$O$_3$ nanoparticles.

16. The supercapacitor of claim 15, wherein the plurality of Fe$_2$O$_3$ nanoparticles is attached to both two opposite surfaces of the second carbon nanotube film.

17. The supercapacitor of claim 1, wherein the internal electrode consists of the first carbon nanotube film and the NiO@MnO$_x$ composite structure, the NiO@MnO$_x$ composite structure consists of a NiO layer and a MnO$_x$ layer, the NiO layer consists of a plurality of NiO nanoparticles, and the MnO$_x$ layer consists of a plurality of MnO$_x$ nanoparticles.

18. The supercapacitor of claim 1, wherein the external electrode consists of the second carbon nanotube film and the Fe$_2$O$_3$ layer, and the Fe$_2$O$_3$ layer consists of a plurality of Fe$_2$O$_3$ nanoparticles.

19. The supercapacitor of claim 1, wherein the internal electrode is obtained by depositing the NiO@MnO$_x$ composite structure on the first carbon nanotube film by magnetron sputtering.

20. The supercapacitor of claim 1, wherein the external electrode is obtained by depositing the Fe$_2$O$_3$ layer on the second carbon nanotube film by magnetron sputtering.

* * * * *